(12) United States Patent  
Arioka et al.

(10) Patent No.: US 6,510,046 B2  
(45) Date of Patent: Jan. 21, 2003

(54) GAS-INSULATED SWITCHGEAR

(75) Inventors: Masahiro Arioka, Tokyo (JP); Tomotaka Yano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 67 days.

(21) Appl. No.: 09/870,781

(22) Filed: Jun. 1, 2001

(65) Prior Publication Data

US 2002/0012226 A1 Jan. 31, 2002

(30) Foreign Application Priority Data

Jun. 2, 2000 (JP) ........................................ 2000-166142

(51) Int. Cl.[7] .............................................. H01H 33/66
(52) U.S. Cl. ........................................ 361/612; 218/120
(58) Field of Search .................. 174/52.1, 59; 361/605, 361/611, 612, 618, 621; 200/48 R, 306, 329; 218/55, 67, 75, 79, 80, 118, 120, 139, 140, 153

(56) References Cited

U.S. PATENT DOCUMENTS 3,917,985 A * 11/1975 Finley ........................ 361/601
5,191,180 A * 3/1993 Kitamura et al. ............ 218/135
5,483,032 A * 1/1996 Trayer ......................... 218/91
6,259,051 B1 * 7/2001 Tanimizu et al. ........... 218/120
6,268,579 B1 * 7/2001 Kajiwara et al. ........... 218/153

FOREIGN PATENT DOCUMENTS

| FR | 2 558 013 | 7/1985 | |
|---|---|---|---|
| GB | 1 459 603 | 12/1976 | |
| JP | 4-344108 | 11/1992 | ........... H02B/13/02 |

* cited by examiner

*Primary Examiner*—Gerald Tolin  
(74) *Attorney, Agent, or Firm*—Sughrue Mion, PLLC

(57) ABSTRACT

A gas-insulated switchgear comprising a gas-insulated first hermetic vessel, at least one electric device selected from a group consisting of an interrupter, a disconnector, a grounding switch and a load switch contained within the hermetic vessel. The switchgear also comprises a cable bushing having a first end that passes through and is secured to a lower vessel wall of the first hermetic vessel and connected to the electric device and a second end that is connectable to a cable, and bus conductor bushings mounted to the hermetic vessel. The switchgear may further comprise a second gas-insulated hermetic vessel disposed between the first vessel and the bus conductor, containing a disconnector or a disconnector and a grounding switch together, and an electrically insulated sealed terminal. The switchgear is compact and inexpensive, free from the damegaes by the explosive phenomenon due to the arc short-circuiting faults.

6 Claims, 3 Drawing Sheets

GAS-INSULATED SWITCHGEAR

CROSS REFERENCE TO RELATED APPLICATION

This application is based on Application No. 2000-166142, filed in Japan on Jun. 2, 2000, the contents of which are hereby incorporated by reference.

BACKGROUND OF THE INVENTION

This invention relates to a gas-insulated switchgear and, more particularly, to a gas-insulated switchgear having accommodated a switch within a hermetic vessel in which an electrically insulating gas is filled.

FIG. 3 illustrates in section a conventional gas-insulated switchgear disclosed in Japanese Patent Laid-Open No. 4-344108. In the figure, within a hermetic vessel 1 filled with an electrically insulating gas such as an $SF_6$ gas, bus conductor bushings 2, disconnectors 3, interrupters 4 and cable bushings 5 are disposed in the named order and, inside of the outer frame 11 and in the front region of the front panel 6 of the hermetic vessel 1, bus conductors 7, cables 8, disconnector operating mechanisms 9 and interrupter operating mechanisms 10 are disposed.

With the structure as described above, the cable bushings 5 are disposed on the front panel 6 of the hermetic vessel 1 together with the disconnector operating mechanisms 9 as well as the interrupter operating mechanisms 10, so that the connection and disconnection of the cables 8 to the cable bushings 5 can be conveniently achieved from the front of the outer frame 11 in a manner similar to the maintenance and inspection of other devices such as the disconnector operating mechanisms 9.

However, in such the conventional gas-insulated switchgear, since the bus conductors 7 and the cables 8 are disposed on the front face of the hermetic vessel 1 and the height dimension of the outer frame 11 is determined by the layout of the bus conductor bushings 2 and the depth dimension of the outer frame 11 is determined by the layout of the bus conductors 7, the overall dimensions of the gas-insulated switchgear were large and the manufacturing cost was high.

Also, if an arc short-circuiting occurs around the bus conductor bushings 2 or the cable bushings 5, a sort of explosion phenomenon in which the arc energy causes a high temperature and a high pressure within a short time is induced at the front face of the outer frame 11.

Accordingly, one object of the present invention is to provide a gas-insulated switchgear free from the above-discussed problems of the conventional gas-insulated switchgear.

Another object of the present invention is to provide a gas-insulated switchgear that is significantly compact and inexpensive as compared to those of the conventional design, easy to handle and has a structure in which the explosive phenomenon as above discussed does not have much effects on the front face of the outer frame even upon the occurrence of the arc short-circuiting faults.

SUMMARY OF THE INVENTION

With the above objects in view, the present invention resides in a gas-insulated switchgear comprising a first hermetic vessel in which an electrically insulating gas is filled, at least one electric device selected from a group consisting of an interrupter, a disconnector, a grounding switch and a load switch contained within the hermetic vessel. The switchgear also comprises a cable bushing having a first end that passes through and is secured to a lower vessel wall of the first hermetic vessel and connected to the electric device and a second end that is connectable to a cable, and a solid-insulated bus conductor bushing mounted to the vessel wall of the hermetic vessel.

The gas-insulated switchgear may further comprise a second hermetic vessel disposed between the first hermetic vessel and the insulated bus conductor, containing a disconnector or a disconnector and a grounding switch together and filled with an electrically insulating gas, and an electrically insulated sealed terminal for connecting the electric device within the first hermetic vessel and the electric device within the second hermetic vessel.

The gas-insulated switchgear may further comprise a bus conductor compartment wall defining a bus conductor compartment externally separated above the vessel wall of the first hermetic vessel or the second hermetic vessel for accommodating the solid insulated bus conductors, and a flapper disposed to the bus conductor compartment wall for discharging an excessive internal pressure to the outside upon the internal pressure rise.

The gas-insulated switchgear may further comprise a grounding terminal disposed to the vessel wall of the hermetic vessels and connected to the electric device within the hermetic vessel and to which a test leads or a test cable can be connected at the time of withstand voltage test to apply a voltage.

The disconnector and the grounding switch may be a three-position switch that can take three positions of ON, OFF and GROUNDED according to the common operational mechanism.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
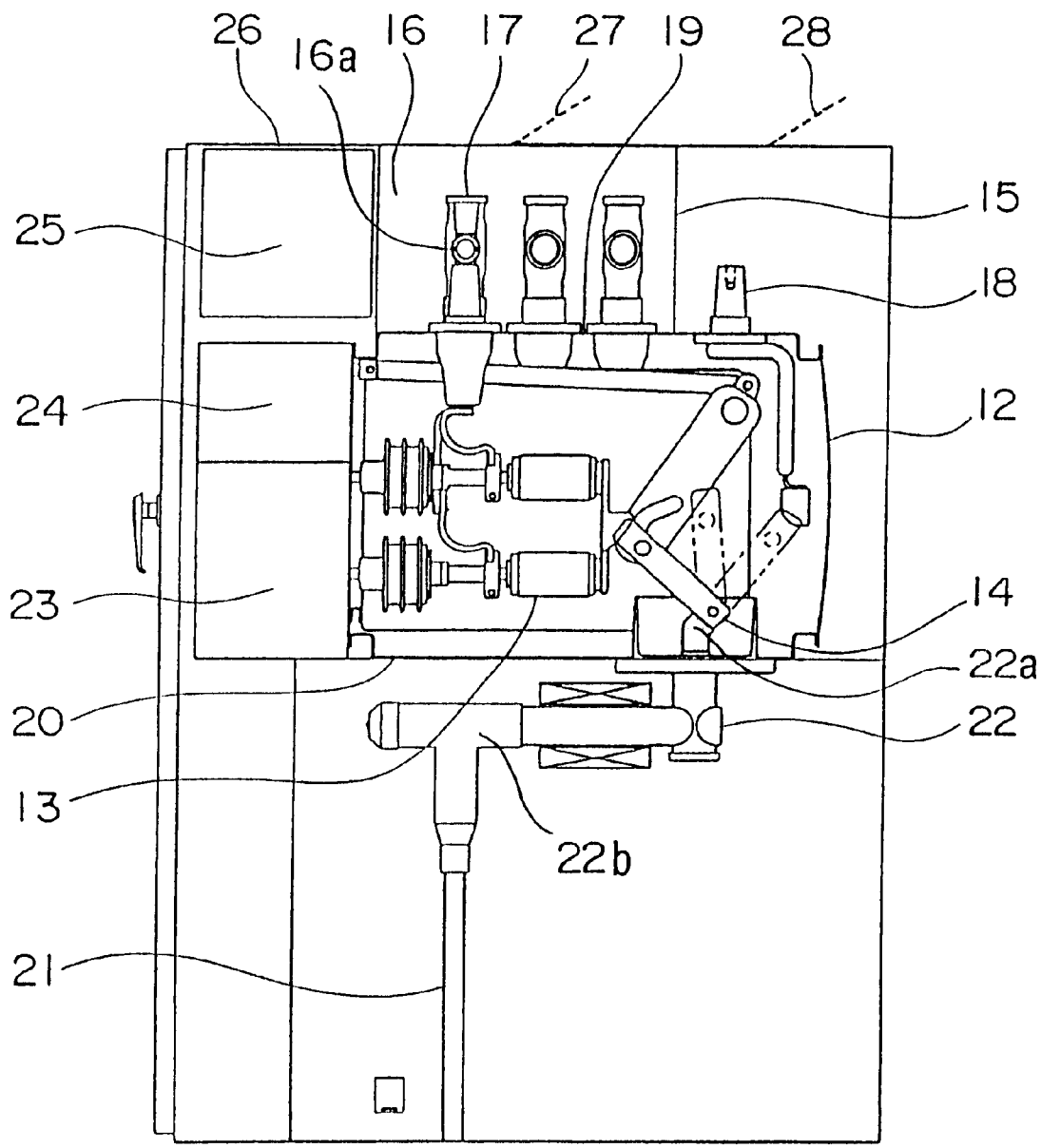
FIG. 1 is a sectional side view showing one embodiment of the gas-insulated switchgear of the present invention.

FIG. 1 illustrates one embodiment of the gas-insulated switchgear of the present invention, which comprises, within a hermetic vessel 12 in which an electrically insulating gas such as an $SF_6$ gas is filled, interrupters 13 each including a vacuum valve, disconnectors, and three-position switches 14 having operating mechanisms in common with grounding switches. Disposed on the top plate 19 of the hermetic vessel 12 are bushings 17 for connecting the solid insulated bus conductors 16a within in a bus conductor compartment 16 defined above the hermetic vessel 12 by a partition 15. Grounding terminals 18 are also disposed on the top plate 19 of the hermetic vessel 12. The bottom plate 20 of the hermetic vessel 12 has mounted thereon cable bushings 22 cranked toward the front of the hermetic vessel 12 for connecting cables 21. Disposed at the front end of the hermetic vessel 12 are an interrupter operating mechanism 23, a three-position switch operating mechanism 24 and a control compartment 25 having a voltage detector therein. The entire apparatus is covered by a rectangular parallelepiped outer housing 26, which has flappers 27 and 28 at its top wall for releasing an excessive pressure within the outer housing 26.

In other words, the gas-insulated switchgear of the present invention comprises a first hermetic vessel 12 in which an electrically insulating gas is filled and at least one electric device selected from an interrupter 13, a disconnector, a grounding switch and a load switch contained within the hermetic vessel 12. In the illustrated embodiment, the electric device 14 is a three-position switch. The cable bushing 22 has a first end 22a that passes through and is secured to the bottom wall of the hermetic vessel 12 and is electrically connected to the electric device 14 within the hermetic vessel 12. The cable bushing 22 is bent outside of the hermetic vessel 12 and extends along the bottom wall so that the second end 22b of the cable bushing 22 is connectable to a cable 21. The top plate 19 or the upper vessel wall of the hermetic vessel 12 has mounted thereon three solid-insulated bushings 17 for the connection to the bus conductors 16a.

The top plate 19 or the upper vessel wall of the hermetic vessel 12 has, mounted thereon the grounding terminals 18 connected to the electric device 14 disposed within the hermetic vessel 12. The grounding terminals 18 can be connected to test leads or test cables (not shown) for applying a voltage for the withstand voltage test.

At the front of the gas-insulated switchgear, the interrupter operating mechanism 23 as well as the three-position switch operating mechanism 24 common to the disconnectors 14 and the grounding switches 14 which are the three-position switches capable of taking the three positions of ON, OFF and GROUNDED. The control compartment 25 is also disposed at the front panel.

In the gas-insulated switchgear having the above-described structure, the cable bushings 22 to which the cables 21 can be connected are disposed below the hermetic vessel 12 containing the interrupters 13 and the three-position switches 14 and the solid insulated bus conductor bushings 17 as well as the grounding terminals 18 are disposed at the upper portion of the hermetic vessel, so that the dimensions of the gas-insulated switchgear are not determined by the cables and the bus conductors and the switchgear can be made small-sized. Also, since the cable bushings 22 has a cranked configuration and is bent toward the front of the hermetic vessel 12, the cable connection can be achieved from the front side of the hermetic vessel 12, allowing the connecting operation to be made easier.

When an arc short-circuiting occurs within the bus conductor compartment 16 and a sort of explosion phenomenon in which the arc energy causes a high temperature and a high pressure to be generated within a short time is induced, the excessive pressure is released by the flappers, whereby the resulted structure of the switchgear, except for the front face of the outer housing 26 and the bus conductor compartment 16 within the gas-insulated switchgear is not affected by the explosive phenomenon.

Figure 2:
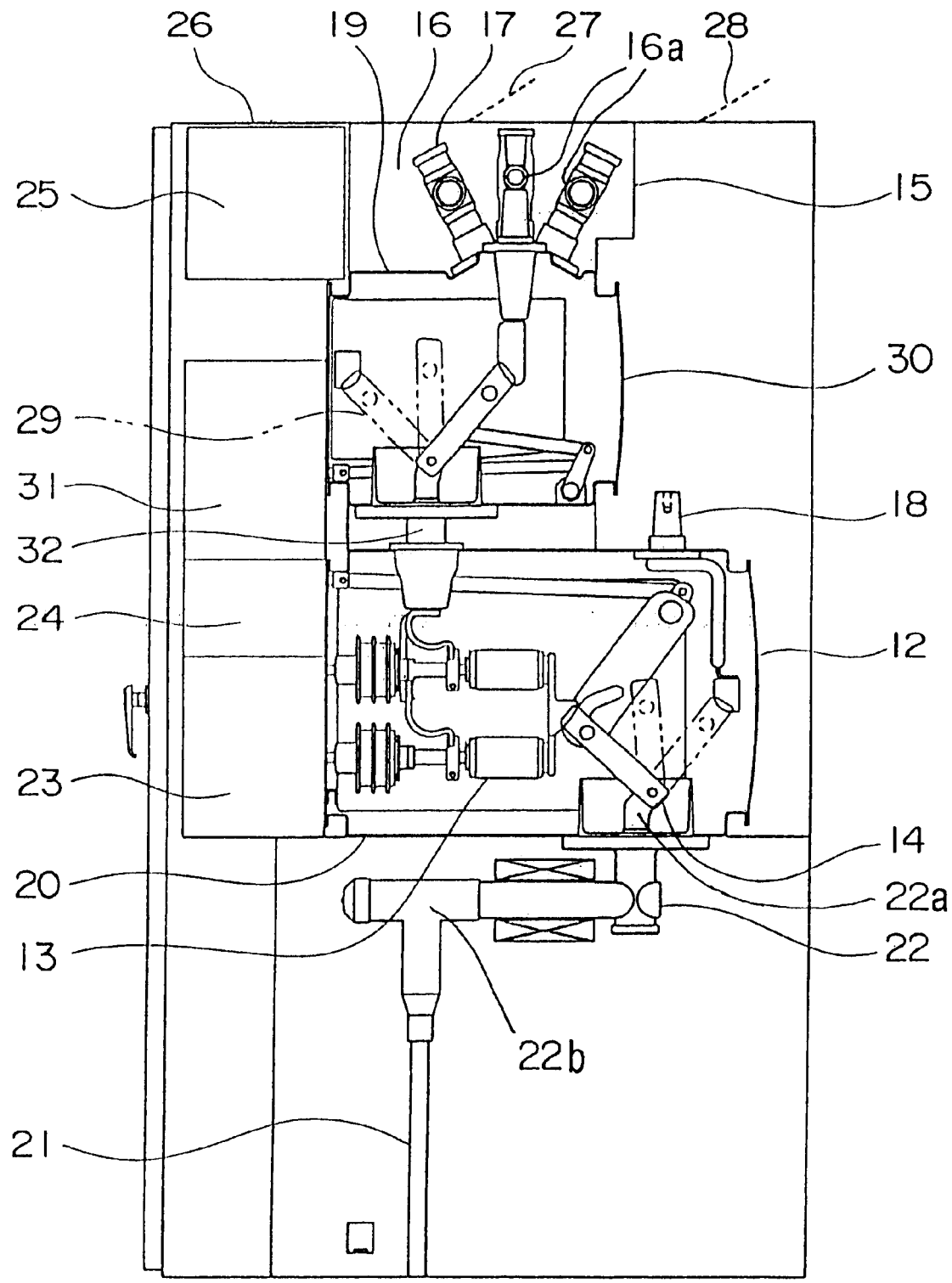
FIG. 2 is a sectional side view showing another embodiment of the gas-insulated switchgear of the present invention.
Figure 3:
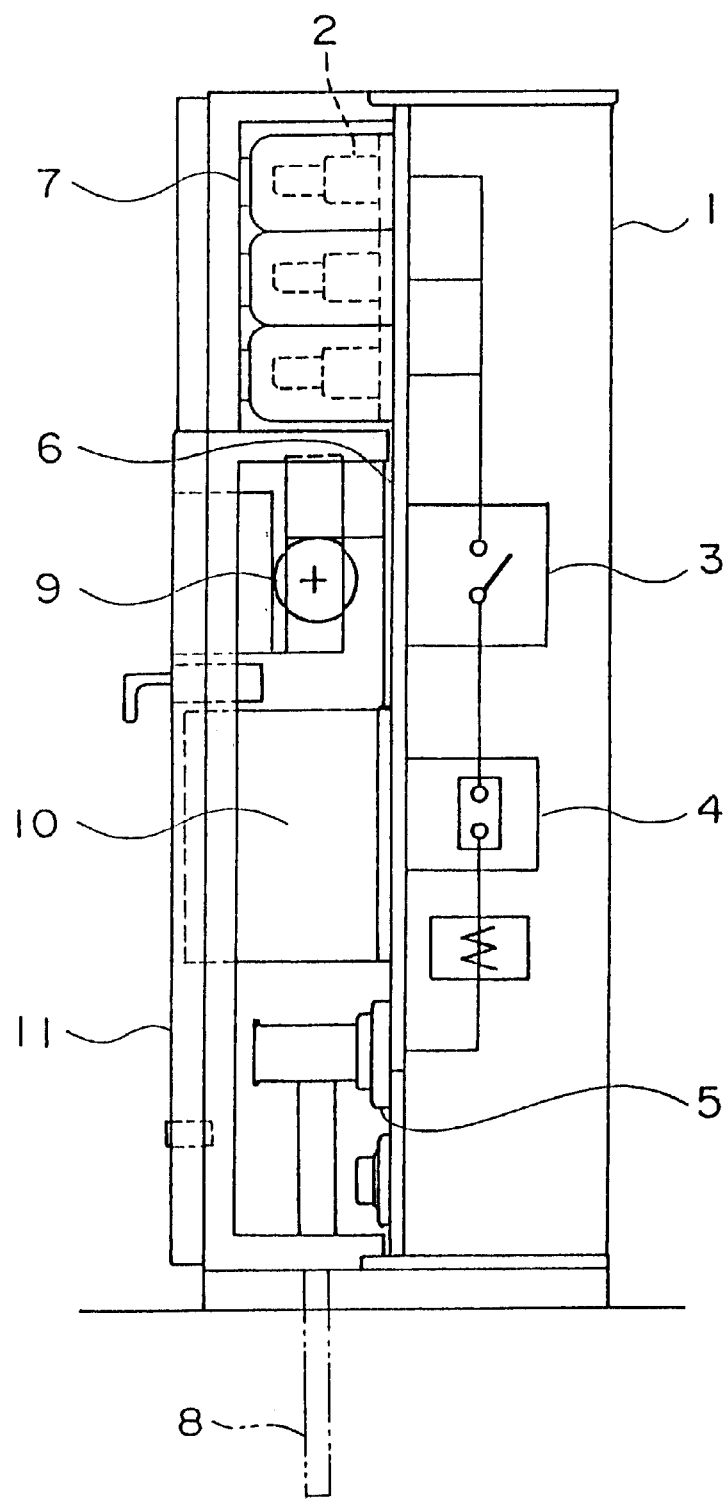
FIG. 3 is a schematic sectional side view showing the gas-insulated switchgear of the conventional design.

FIG. 2 illustrates another embodiment of the gas-insulated switchgear of the present invention, which comprises, within the second hermetic vessel 30 filled with an electrically insulating gas, the three-position switch 29 having a common operating mechanism for the disconnectors and the grounding switches, and the second hermetic vessel 30 is disposed between the first hermetic vessel 12 containing the interrupters 13 and the three-position switches 14 and the bus conductor compartment 16. Also, sealed terminals 32 are provided for electrically connecting the electric devices 13 within the first hermetic vessel 12 and the electric devices 29 within the second hermetic vessel 30. In other respects, the structure is similar to that shown in FIG. 1 in conjunction with the first embodiment.

According to the gas-insulated switchgear having the above-described structure, even in the gas-insulated switchgear having the first hermetic vessel 12 containing the interrupters 13 and the three-position switches 14 and the second hermetic vessel 30 containing the three-position switchgear, advantageous results similar to those obtained in the embodiment shown in FIG. 1 can be obtained and the connection structure for the second hermetic vessel 30 can be made simple and compact.

As has been described, according to the present invention, the gas-insulated switchgear comprises a first hermetic vessel in which an electrically insulating gas is filled, at least one electric device selected from a group consisting of an interrupter, a disconnector, a grounding switch and a load switch contained within the hermetic vessel. The switchgear also comprises a cable bushing having a first end that passes through and is secured to a lower vessel wall of the first hermetic vessel and connected to the electric device and a second end that is connectable to a cable, and a solid-insulated bus conductor bushing mounted to the vessel wall of the hermetic vessel. Therefore, the gas-insulated switchgear is significantly compact and inexpensive as compared to those of the conventional design, easy to handle and has a structure in which the explosive phenomenon as above discussed does not have much effects on the front face of the outer frame even upon the occurrence of the arc short-circuiting faults.

The gas-insulated switchgear may further comprise a second hermetic vessel disposed between the first hermetic vessel and the insulated bus conductor, containing a disconnector or a disconnector and a grounding switch together and filled with an electrically insulating gas, and an electrically insulated sealed terminal for connecting the electric device within the first hermetic vessel and the electric device within the second hermetic vessel. Therefore, the switchgear can be small-sized and inexpensive, easy in cable connecting operation and has a simple connecting structure for the second hermetic vessel.

The gas-insulated switchgear may further comprise a bus conductor compartment wall defining a bus conductor compartment externally separated above the vessel wall of the first hermetic vessel or the second hermetic vessel for accommodating the solid insulated bus conductors, and a flapper disposed to the bus conductor compartment wall for discharging an excessive internal pressure to the outside upon the internal pressure rise. Therefore, the gas-insulated switchgear can have a structure in which the explosive phenomenon due to the short-circuiting arc energy does not have much effect on the front face of the outer frame even upon the occurrence of the arc short-circuiting faults.

The gas-insulated switchgear may further comprise a grounding terminal disposed to the vessel wall of the hermetic vessels and connected to the electric device within the hermetic vessel and to which a test leads or a test cable can be connected at the time of withstand voltage test to apply a voltage. Therefore, the gas-insulated switchgear can have grounding terminals through which a voltage can be applied, so that the gas-insulated switchgear can be made small-sized, less expensive and easy in cable connecting operation.

The disconnector and the grounding switch may be a three-position switch that can take three positions of ON, OFF and GROUNDED according to the common operational mechanism, so that the number of the operating mechanism can be reduced and the mechanical interlocking linkage between the operating mechanisms can be made simple, thus allowing the switchgear to be significantly compact and inexpensive and improved in operability.

What is claimed is:

1. A gas-insulated switchgear, comprising:
   a first hermetic vessel in which an electrically insulating gas is filled;
   at least one electric device selected from a group consisting of an interrupter, a disconnector, a grounding switch and a load switch contained within said first hermetic vessel;
   a cable bushing having a first end that passes through and is secured to a lower vessel wall of said first hermetic vessel and connected to said electric device and a second end that is connectable to a cable;
   a solid-insulated bus conductor bushing mounted to an upper vessel wall of said first hermetic vessel; and
   a bus conductor compartment wall defining a bus conductor compartment externally separated above said upper vessel wall of said first hermetic vessel for accommodating solid insulated bus conductors.

2. The gas-insulated switchgear as claimed in claim 1, further comprising a flapper disposed on said bus conductor compartment wall for discharging an excessive internal pressure to the outside upon the internal pressure rise.

3. The gas-insulated switchgear as claimed in claim 1, further comprising a grounding terminal disposed on the upper vessel wall of said first hermetic vessels and connected to the electric device within said first hermetic vessel.

4. The gas-insulated switchgear as claimed in claim 1, wherein said disconnector and said grounding switch are three-position switch that can take three positions of ON, OFF and GROUNDED according to the common operational mechanism.

5. A gas-insulated switchgear, comprising:
   a first hermetic vessel in which an electrically insulating gas is filled;
   at least one electric device selected from a group consisting of an interrupter, a disconnector, a grounding switch and a load switch contained within said first hermetic vessel;
   a cable bushing having a first end that passes through and is secured to a lower vessel wall of said first hermetic vessel and connected to said electric device and a second end that is connectable to a cable;
   a second hermetic vessel disposed above said first hermetic vessel, containing at least one electric device and filled with an electrically insulating gas;
   a solid-insulated bus conductor bushing mounted to an upper vessel wall of said second hermetic vessel; and
   an electrically insulated sealed terminal connecting the electric device within said first hermetic vessel and the electric device within said second hermetic vessel.

6. The gas-insulated switchgear as claimed in claim 5, further comprising a bus conductor compartment wall defining a bus conductor compartment externally separated above an upper vessel wall of said second hermetic vessel for accommodating solid insulated bus conductors, and
   a flapper disposed on said bus conductor compartment wall for discharging an excessive internal pressure to the outside upon the internal pressure rise.

* * * * *